(12) United States Patent
Ha

(10) Patent No.: US 9,137,846 B2
(45) Date of Patent: Sep. 15, 2015

(54) METHOD AND APPARATUS FOR SELECTING OPTIMUM TRANSFER PROTOCOL

(75) Inventor: Young-Seok Ha, Seoul (KR)

(73) Assignee: CDNETWORKS CO., LTD., Seoul (KR)

( * ) Notice: Subject to any disclaimer, the term of this patent is extended or adjusted under 35 U.S.C. 154(b) by 211 days.

(21) Appl. No.: 13/377,492

(22) PCT Filed: Jun. 11, 2010

(86) PCT No.: PCT/KR2010/003761
§ 371 (c)(1),
(2), (4) Date: Feb. 3, 2012

(87) PCT Pub. No.: WO2010/143910
PCT Pub. Date: Dec. 16, 2010

(65) Prior Publication Data
US 2012/0191871 A1    Jul. 26, 2012

(30) Foreign Application Priority Data
Jun. 11, 2009    (KR) .......................... 10-2009-0051965

(51) Int. Cl.
*G06F 15/16*    (2006.01)
*H04W 80/06*    (2009.01)
*H04L 29/06*    (2006.01)
(Continued)

(52) U.S. Cl.
CPC ............... *H04W 80/06* (2013.01); *H04L 69/08* (2013.01); *H04L 69/18* (2013.01); *H04L 12/2836* (2013.01); *H04L 43/0829* (2013.01);
(Continued)

(58) Field of Classification Search
CPC ....... H04L 69/19; H04L 69/163; H04L 47/12; H04L 12/2836; H04L 47/19; H04L 47/193; H04L 69/08; H04W 28/10; H04W 80/06
USPC .................................................. 709/230–235
See application file for complete search history.

(56) References Cited

U.S. PATENT DOCUMENTS 7,283,474 B1 *  10/2007  Bergenwall .................... 370/235
7,778,273 B2      8/2010  Luo et al.
(Continued)

FOREIGN PATENT DOCUMENTS

JP            11-017840 A      1/1999
KR      10-2001-0094593 A     11/2001
(Continued)

OTHER PUBLICATIONS

PCT International Search Report, PCT/KR2010/003761, Feb. 22, 2011, 5 Pages.

*Primary Examiner* — Jeong S Park
(74) *Attorney, Agent, or Firm* — Fenwick & West LLP

(57) ABSTRACT

Provided are a method and apparatus for selecting an optimal transport protocol. According to an exemplary embodiment of the present invention, there is provided a method for selecting a transport protocol, the method including: detecting a network state with another node connected to a node; and selecting a transport protocol between the node and the other node using the network state, the selected transport protocol being a modified transport protocol'.
According to the present invention, the modified transport protocol' may be used even in varying network circumstances, and the modified transport protocol' may be widely used in a shared communication network.

5 Claims, 2 Drawing Sheets

(51) Int. Cl.
*H04L 12/28* (2006.01)
*H04L 12/801* (2013.01)
*H04L 12/26* (2006.01)

(52) U.S. Cl.
CPC ............ *H04L43/0864* (2013.01); *H04L 47/19* (2013.01); *H04L 69/16* (2013.01)

(56) References Cited

U.S. PATENT DOCUMENTS

| | | | |
|---|---|---|---|
| 2004/0111652 A1* | 6/2004 | Shoaib et al. | 714/15 |
| 2007/0038652 A1* | 2/2007 | Feinberg et al. | 707/100 |
| 2007/0091918 A1 | 4/2007 | Luo et al. | |
| 2008/0075084 A1* | 3/2008 | Choi et al. | 370/392 |
| 2008/0144663 A1* | 6/2008 | Johnson et al. | 370/469 |
| 2009/0055550 A1* | 2/2009 | Way et al. | 709/233 |
| 2009/0135252 A1* | 5/2009 | Matsuda et al. | 348/143 |
| 2009/0271655 A1* | 10/2009 | Hotta et al. | 714/4 |

FOREIGN PATENT DOCUMENTS

| | | |
|---|---|---|
| KR | 10-2008-0068808 A | 7/2008 |
| WO | WO 2007/047936 A1 | 4/2007 |

\* cited by examiner

METHOD AND APPARATUS FOR SELECTING OPTIMUM TRANSFER PROTOCOL

TECHNICAL FIELD

The present invention relates to a method and an apparatus for selecting a transport protocol, and more particularly, a method and an apparatus for selecting a transport protocol so that an optimal transport protocol may be selected based on a circumstance of a communication network with respect to a transport protocol that is a rule used when transmitting data over the communication network.

BACKGROUND ART

Recently, with development in a digital processing apparatus such as a computer and the like and with development of a communication network, a large amount of data has been transmitted and received over the communication network.

The communication network is configured so that a large number of apparatuses, communication lines, and the like may be connected to each other. When constituent elements constituting the communication network are to exchange data, common rules and procedures may need to be determined with respect to many portions such as a type of information, an encoding scheme, a transport scheme, an error and flow control, and the like, and be followed. A set of such rules or procedures is referred to as a protocol.

Meanwhile, among a variety of protocols, a protocol used in a transport layer corresponding to a layer 4 among seven layers of an open system interconnection (OSI) providing a communication path and communication means is referred to as a transport protocol.

Representatively, a transport protocol such as a transmission control protocol (TCP), a user datagram protocol (UDP), and the like, is used for the above transport protocol.

Meanwhile, when transmitting and receiving data over the communication network, how quickly and accurately data is transmitted from a transmitting apparatus transmitting data to a receiving apparatus receiving becomes an issue.

To enhance a data transmission rate, efforts have been made in the related art to increase a data transmission/reception rate through physical enhancement of a data transmitting/receiving apparatus or enhancement of an algorithm about a transmission method and the like.

Further, research and development is actively ongoing about modified transport protocol capable of increasing a data transmission/reception rate while maintaining an original rule or procedure even with respect to a transport protocol determined as a rule.

However, in the case of such modified transport protocol', most modified transport protocol's generally consider only a predetermined characteristic of a network and thus, are not widely used in varying network circumstances.

For example, assume that P1 is a modified transport protocol' suitable for minimizing the occurrence of data loss, and assume that P2 is a modified transport protocol' suitable for minimizing delay or latency in receiving data.

Meanwhile, when a network state corresponds to a case where large data loss always occurs during data transmission between nodes, it is possible to maximize the data transmission efficiency by applying P1, which is the modified transport protocol' suitable for minimizing the occurrence of data loss.

However, depending on cases, when a network state between nodes does not correspond to the case where the large data loss occurs, but corresponds to a case where significant delay or latency occurs in receiving data, the large data loss may not occur.

In this case, when the protocol PI is applied as is and when the significant delay or latency occurs in receiving data, the optimal data transmission may not be performed.

That is, modified transport protocol's are developed to be suitable for only a case where a corresponding network circumstance occurs by taking into consideration of only a predetermined network circumstance and thus, are suitable for a predetermined network such as a private network. However, the modified transport protocol's are not widely used in a network such as, particularly, a shared network having a complex configuration.

DISCLOSURE

Technical Problem

The present invention is contrived to solve the problems in the related art and an object of the present invention is to provide a method and an apparatus for selecting an optimal transport protocol so that a modified transport protocol' may be used even in varying network circumstances.

Further, another object of the present invention is to provide a method and an apparatus for selecting an optimal transport protocol that enables a modified transport protocol' to be widely used in a shared communication network.

Other objects of the present invention may be readily understood from description relating to the following exemplary embodiments.

Technical Solution

In order to achieve the objects, according to an aspect of the present invention, a method of selecting a transport protocol is provided.

According to an exemplary embodiment of the present invention, there is provided a method of selecting a transport protocol in a node constituting a communication network, the method including: (a) detecting a network state with another node connected to the node; and (b) selecting a transport protocol between the node and the other node using the network state, the transport protocol being a modified transport protocol'.

(a) The detecting may be performed using an agent program.

(a) The detecting may be performed by including at least one of round trip time (RTT) information, data transmission loss rate information of the communication network, line type information of the communication network, and user information of the communication network.

(b) The selecting may be performed by further using information about at least one of a type and a magnitude of data to be transmitted between the node and the other node.

The modified transport protocol' may be at least one of a transport protocol minimizing loss in transmitting data, a transport protocol minimizing latency in transmitting data, and a transport protocol minimizing a slow start of a transport control protocol (TCP).

According to another aspect of the present invention, a data transmitting and receiving method is provided.

According to an exemplary embodiment of the present invention, there is provided a data transmitting and receiving method of transmitting and receiving data using a transport protocol selected by a method of selecting a transport protocol in a node constituting a communication network, the method including: (a) detecting a network state with another node connected to the node; and (b) selecting a transport protocol between the node and the other node using the network state, the transport protocol being a modified transport protocol'.

(a) The detecting may be performed using an agent program.

(a) The detecting may be performed by including at least one of RTT information, data transmission loss rate information of the communication network, line type information of the communication network, and user information of the communication network.

(b) The selecting may be performed by further using information about at least one of a type and a magnitude of data to be transmitted between the node and the other node.

The modified transport protocol' may be at least one of a transport protocol minimizing loss in transmitting data, a transport protocol minimizing latency in transmitting data, and a transport protocol minimizing a slow start of a TCP.

(a) The detecting and (b) the selecting may be performed even while transmitting and receiving data using the selected transport protocol.

According to yet another aspect of the present invention, an apparatus for selecting a transport protocol is provided.

According to an exemplary embodiment of the present invention, there is provided an apparatus for selecting a transport protocol in a node constituting a communication network, the apparatus including: a network state detecting unit to detect a network state with another node connected to the node; and a transport protocol selecting unit to select a transport protocol between the node and the other node using the network state, the transport protocol being a modified transport protocol'.

The network state detecting unit may perform detection of the network state using an agent program.

The network state detecting unit may perform detection of the network state by including at least one of RTT information, data transmission loss rate information of the communication network, line type information of the communication network, and user information of the communication network.

The transport protocol selecting unit may select the transport protocol between the node and the other node by further using information about at least one of a type and a magnitude of data to be transmitted between the node and the other node.

The modified transport protocol' may be at least one of a transport protocol minimizing loss in transmitting data, a transport protocol minimizing latency in transmitting data, and a transport protocol minimizing a slow start of a TCP.

According to still another aspect, a data transmitting and receiving apparatus is provided.

According to an exemplary embodiment of the present invention, there is provided a data transmitting and receiving apparatus for transmitting and receiving data using a transport protocol selected by an apparatus for selecting a transport protocol in a node constituting a communication network, including: a network state detecting unit to detect a network state with another node connected to the node; and a transport protocol selecting unit to select a transport protocol between the node and the other node using the network state, the transport protocol being a modified transport protocol'.

The network state detecting unit may perform detection of the network state using an agent program.

The network state detecting unit may perform detection of the network state by including at least one of RTT information, data transmission loss rate information of the communication network, line type information of the communication network, and user information of the communication network.

The transport protocol selecting unit may select the transport protocol between the node and the other node by further using information about at least one of a type and a magnitude of data to be transmitted between the node and the other node.

The modified transport protocol' may be at least one of a transport protocol minimizing loss in transmitting data, a transport protocol minimizing latency in transmitting data, and a transport protocol minimizing a slow start of a TCP.

The transport protocol selecting apparatus may detect the network state with the other node connected to the node and select the transport protocol between the node and the other node using the network state even while transmitting and receiving data using the selected transport protocol According to still another aspect of the present invention, a recording medium storing a program to implement a method of selecting a transport protocol is provided.

According to an exemplary embodiment of the present invention, there is provided a recording medium storing a program to implement a method of selecting a transport protocol in a node constituting a communication network, the method including: (a) detecting a network state with another node connected to the node; and (b) selecting a transport protocol between the node and the other node using the network state, the transport protocol being a modified transport protocol'.

(a) The detecting may be performed using an agent program.

(a) The detecting may be performed by including at least one of RTT information, data transmission loss rate information of the communication network, line type information of the communication network, and user information of the communication network.

(b) The selecting may be performed by further using information about at least one of a type and a magnitude of data to be transmitted between the node and the other node.

The modified transport protocol' may be at least one of a transport protocol minimizing loss in transmitting data, a transport protocol minimizing latency in transmitting data, and a transport protocol minimizing a slow start of a TCP.

According to still yet another aspect of the present invention, a recording medium storing a program to implement a data transmitting and receiving method is provided.

According to an exemplary embodiment of the present invention, there is provided a recording medium storing a program to implement a data transmitting and receiving method of transmitting and receiving data using a transport protocol selected by a method of selecting a transport protocol in a node constituting a communication network, the method including: (a) detecting a network state with another node connected to the node; and (b) selecting a transport protocol between the node and the other node using the network state, the transport protocol being a modified transport protocol'.

(a) The detecting may be performed using an agent program.

(a) The detecting may be performed by including at least one of RTT information, data transmission loss rate information of the communication network, line type information of the communication network, and user information of the communication network.

(b) The selecting may be performed by further using information about at least one of a type and a magnitude of data to be transmitted between the node and the other node.

The modified transport protocol' may be at least one of a transport protocol minimizing loss in transmitting data, a transport protocol minimizing latency in transmitting data, and a transport protocol minimizing a slow start of a TCP.

(a) The detecting and (b) the selecting may be performed even while transmitting and receiving data using the selected transport protocol.

Advantageous Effects

As described above, according to a method and an apparatus for selecting an optimal transport protocol of the present invention, it is possible to use a modified transport protocol' even in varying network circumstances.

Further, the modified transport protocol' may be widely used in a shared communication network.

BEST MODE

Figure 1:
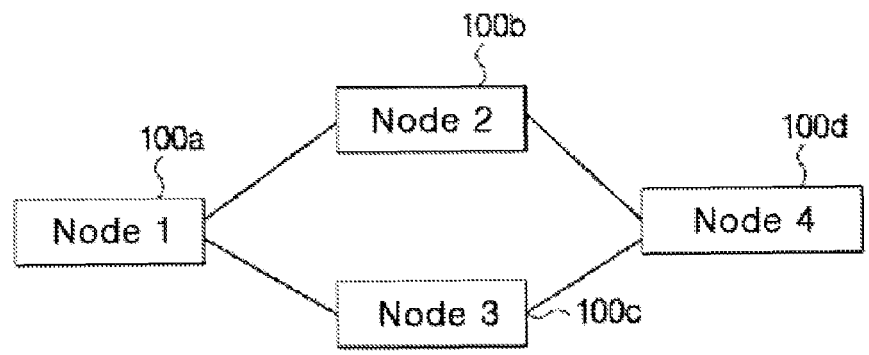
FIG. 1 is an exemplary diagram illustrating a configuration of a network system in which a method of selecting an optimal transport protocol according to an exemplary embodiment of the present invention may be performed.

Although the present invention can be modified variously and have several embodiments, the exemplary embodiments are illustrated in the accompanying drawings and will be described in detail in the detailed description. However, the present invention is not limited to the specific embodiments and should be construed as including all the changes, equivalents, and substitutions included in the spirit and scope of the present invention.

In describing each drawing, like reference numerals refer to like elements. When it is determined that detailed description relating to a known technology may make the purpose of the present invention ambiguous in describing the present invention, the detailed description will be omitted here.

Terms "first", "second", and the like may be used to explain various constituent elements, however, the constituent elements should not be limited to the terms. The terminals are used only to identify a single constituent element from another constituent element.

For example, without departing from the scope of the invention, a first constituent element may be referred to as a second constituent element and similarly, the second constituent element may also be referred to as the first constituent element.

Terms "and/or" include a combination of a plurality of relevant described items or any one of the plurality of relative described items.

When a predetermined constituent element is described to be "connected to" or "accessed by" another constituent element, it needs to be understood that the constituent element may be directly connected to or accessed by the other constituent element, however, still another constituent element may exist between the constituent elements.

On the contrary, when the constituent element is described to be "directly connected to" or "directly accessed by" the other constituent element, it should be understood that still another constituent element does not exist between the constituent elements.

The terms used in the specification are used to explain the embodiments and not to limit the present invention.

In the specification, a singular type may be also used as a plural type unless stated specifically. Terms "comprises/comprising", "includes/including", and the like, used in the specification are used to indicate the existence of features, numbers, steps, operations, constituent elements, parts, described in the specification or combinations thereof and thus, should be understood not to preclude the existence or addition of one or more other features, numbers, steps, operations, constituent elements, parts, or combinations thereof.

Unless defined differently, all terms used herein, including technical or scientific terminology, have the same meaning as a meaning generally understood by those skilled in the art.

Terms defined in generally used dictionaries should be interpreted to have a meaning that matches a meaning of a context of the related art and thus, should not be interpreted in an ideologically or excessively formality meaning unless clearly defined.

Hereinafter, exemplary embodiments of the present invention will be described in detail with reference to the accompanying drawings. Throughout the specification, like reference numerals refer to like elements and repeated description relating thereto will be omitted.

Initially, a configuration of a network system in which a method of selecting an optimal transport protocol according to an exemplary embodiment of the present invention may be performed will be described with reference to FIG. 1.

FIG. 1 is an exemplary diagram illustrating a configuration of a network system in which a method of selecting an optimal transport protocol according to an exemplary embodiment of the present invention may be performed.

As shown in FIG. 1, the network system includes nodes 100a, 100b, 100c, and 100d that are constituent elements, that is, apparatuses constituting a network.

FIG. 1 shows an example in which the node (1) 100a is connected to each of the node (2) 100b and the node (3) 100c, and each of the node (2) 100b and the node (3) 100c is connected to the node (4) 100d.

In connections among the nodes 100a, 100b, 100c, and 100d, for example, a connection between the node (1) 100a and the node (2) 100b, a connection between the node (1) 100a and the node (3) 100c, a connection between the node (2) 100b and the node (4) 100d, a connection between the node (3) 100c and the node (4) 100d, and the like, a network state between respective nodes may be different.

For example, the connection between the node (1) 100a and the node (2) 100b may be a connection over the Internet that is a representative public communication network, and the connection between the node (1) 100a and the node (3) 100c may be a connection over a private network.

Further, even though all of the connection between the node (2) 100b and the node (4) 100d and the connection between the node (3) 100c and the node (4) 100d are connections over the Internet, a data transmission rate, that is, a data transmission/reception rate between nodes varies based on a type of line or a node performance, an amount of data transmitted and received between nodes, and the like.

Meanwhile, a state of the network may be detected using a network state detection program and the like such as an agent program.

A current connection state between nodes, that is, a current network state may be determined using the detection result.

The determination of the state may be performed depending on whether a corresponding characteristic significantly occurs in the network based on a predetermined criterion.

For example, in the case of transmitting and receiving data between the node (1) 100a and the node (2) 100b, when a data transmission loss, that is, loss of greater than a predetermined reference value occurs, a network state between the node (1) 100a and the node (2) 100b may be determined as a network in which large loss occurs.

On the other hand, in the case of transmitting and receiving data between the node (2) 100b and the node (3) 100c, when a delay time in transmitting and receiving data, that is, latency of greater than a predetermined reference value occurs, a network state between the node (1) 100a and the node (3) 100c may be determined as a network in which significant latency occurs.

The determination of the network state may be performed by including at least one of a round trip time (RTT) information, data transmission loss rate information of the communication network, line type information of the communication network, and user information of the communication network.

In the example of FIG. 1, for example, assume that loss of greater than the predetermined reference value occurs between the node (1) 100a and the node (2) 100b, latency of greater than the predetermined reference value occurs between the node (1) 100a and the node (3) 100c, and loss and latency of greater than the predetermined reference values occur between the node (2) 100b and the node (4) 100d.

A protocol between the node (3) 100c and the node (4) 100d is assumed that even though loss and latency are less than the predetermined reference values and large data transmission needs to be performed, a transport protocol is set to a transport control protocol (TCP) and thus, transmission and reception of data becomes slow due to a slow start that is a characteristic of the TCP.

The network state between the respective nodes as above may be expressed by the following Table 1.

TABLE 1

| Class. | Node 1 | Node 2 | Node 3 | Node 4 |
|---|---|---|---|---|
| Node 1 | — | LOSS | LATENCY | — |
| Node 2 | LOSS | — | — | LOSS/LATENCY |
| Node 3 | LATENCY | — | — | SLOW START |
| Node 4 | — | LOSS/LATENCY | SLOW START | — |

Meanwhile, when information about the network state between the respective nodes is collected, a modified transport protocol' suitable for each network state is selected using the information.

For example, assume that P1 is a modified transport protocol' capable of minimizing a data transmission loss rate, P2 is a modified transport protocol' capable of minimizing latency, P3 is a modified transport protocol' capable of minimizing all of loss and latency, and P4 is a protocol in which a slow start characteristic of a TCP is corrected.

In this case, each transport protocol selected for transmitting and receiving data between nodes may be selected as shown in the following Table 2.

TABLE 2

| Class. | Node 1 | Node 2 | Node 3 | Node 4 |
|---|---|---|---|---|
| Node 1 | — | P1 | P2 | — |
| Node 2 | P1 | — | — | P3 |
| Node 3 | P2 | — | — | P4 |
| Node 4 | — | P3 | P4 | — |

Accordingly, a type of the transport protocol between the respective nodes may vary. Further, transmission and reception of data may be performed by periodically detecting the network state between the respective nodes, reflecting a change in the network state, and thereby selecting an optimal transport protocol based on the network state.

Meanwhile, when selecting a type of the modified transport protocol', it is possible to determine the modified transport protocol' by also considering a magnitude or a type of data to be transmitted between nodes, and the like.

For example, when an amount of data to be transmitted from the node (1) 100a to the node (2) 100b is large, it is possible to select the modified transport protocol' by also considering whether the modified transport protocol' is suitable for transmitting the large amount of data.

Further, for example, in the case of stream data, to seamlessly and continuously transmit data, it is possible to select the modified transport protocol' by also considering whether the modified transport protocol' is suitable for transmitting the stream data.

Even while transmission of data is being performed, selection of the modified transport protocol' may be performed at predetermined intervals whereby change of the modified transport protocol' may be performed.

For example, by detecting the network state while transmitting data, the network state may be shifted from a state in which significant latency occurs to a state in which large data loss occurs.

In this case, by detecting the network state periodically and changing the modified transport protocol' to a suitable modified transport protocol' based on the information, transmission of data may be more efficiently performed.

Meanwhile, as described above, the corrected transport protocol of the present invention refers to a transport protocol, not a transport protocol that is used as is as defined in a standard.

The modified transport protocol' is also referred to as a high performance protocol, an optimization protocol, a specialized protocol, and the like, however, is not limited thereto.

Meanwhile, in many cases, only a portion of a function of the modified transport protocol' is basically corrected to be suitable for a predetermined network circumstance based on a standard protocol and thereby used for a predetermined circumstance.

Accordingly, in many cases, the modified transport protocol' may be used as are in apparatuses using the conventional standard protocol.

However, in many cases, the modified transport protocol' is specialized for the predetermined network circumstance and thus, has not been widely used in a variously changing network.

However, according to the present invention, a modified transport protocol' that has been studied and developed for faster and more accurate transmission and reception of data may be employed even in a public communication network, such as the Internet, by determining a transport protocol between respective nodes based on a network state.

Meanwhile, a variety of modified transport protocol's are proposed based on request for comments (RFC).

For example, in the case of a TCP that is representative as a transport protocol, RFC 1323 proposes a TCP related criterion capable of supporting a large window size. A TCP that satisfies the above criterion and also is compatible with an original TCP is proposed so that the TCP may be used even in a system with significant latency.

Further, in the case of the TCP, an initial window size is predetermined and a window size restrictively increases from the initial window size. Therefore, when transmitting large data, an issue that it takes time until transmission of large data is completed, which is called "slow start", occurs.

To solve the slow start issue of the TCP, a modified transport protocol' capable of adjusting the initial window size of the TCP is also proposed.

As a transport protocol for enhancing a predetermined function in an original standard transport protocol, the modified transport protocol' of the present invention is also referred to as a high performance protocol, an optimization protocol, a specialized protocol, and the like, however, is not limited thereto. As described above, various types of modified transport protocol's may be used for the present invention.

Hereinafter, a method of selecting a transport protocol according to an exemplary embodiment of the present invention will be described with reference to FIG. 2.

Figure 2:
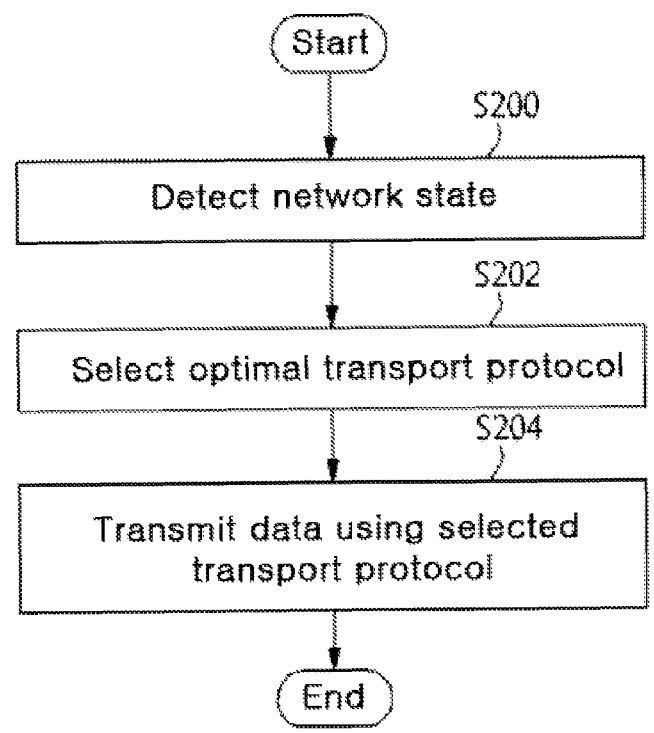
FIG. 2 is a flowchart illustrating a method of selecting an optimal transport protocol according to an exemplary embodiment of the present invention.

FIG. 2 is a flowchart illustrating a method of selecting an optimal transport protocol according to an exemplary embodiment of the present invention.

As shown in FIG. 2, the method of selecting the optical transport protocol according to the exemplary embodiment of the present invention detects a network state of another single node or between nodes to transmit and receive data (S200).

As described above, detection of the network state may be performed using an agent program and the like. There is no restriction on information collected through the detection of the network state as far as the information is associated with a data transmission/reception function, for example, RTT, loss, latency, performance information of each node, and the like.

Meanwhile, when the detection of the network state is completed, an optimal transport protocol between nodes to transmit and receive data is selected (S202).

The selected transport protocol is a modified transport protocol' as described above, and a method of selecting the modified transport protocol' is also described above.

When the modified transport protocol' is selected, transmission of data between nodes is performed using the selected modified transport protocol' (S204).

Meanwhile, the method of selecting the transport protocol according to the present invention may be configured as a program and thereby be stored in a computer-readable recoding medium (a CD ROM, a RAM, a ROM, floppy disk, a hard disk, a photomagnetic disk, and the like).

Hereinafter, a configuration in which selection of a transport protocol according to the present invention is realized as an apparatus will be described with reference to FIG. 3.

Figure 3:
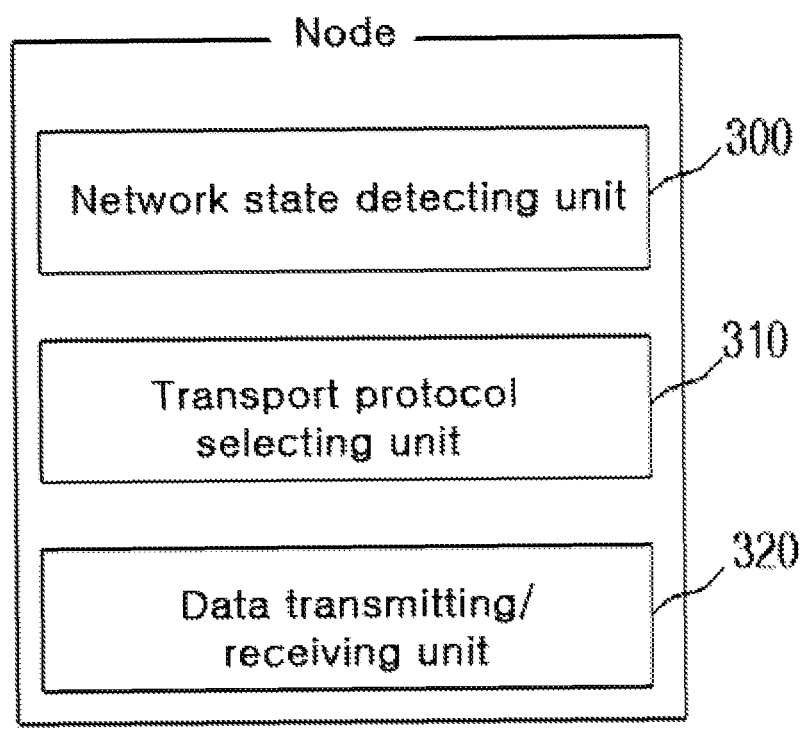
FIG. 3 is a configuration diagram illustrating a configuration of an apparatus for selecting an optimal transport protocol according to an exemplary embodiment of the present invention.

FIG. 3 is a configuration diagram illustrating a configuration of an apparatus for selecting an optimal transport protocol according to an exemplary embodiment of the present invention.

As shown in FIG. 3, the apparatus for selecting the transport protocol according to the exemplary embodiment of the present invention may include a network state detecting unit 300, a transport protocol selecting unit 310, and a data transmitting/receiving unit 320.

The network state detecting unit 300 detects a network state of another single node or between nodes to transmit and receive data.

The network state detecting unit 300 may detect the network state using an agent program and the like. As described above, there is no restriction on information collected through the detection of the network state as far as the information is associated with a data transmission/reception function, for example, RTT, loss, latency, performance information of each node, and the like.

The transport protocol selecting unit 310 selects an optimal transport protocol between nodes to transmit and receive data using information about the network state detected by the network state detecting unit 300.

The transport protocol selected by the transport protocol selecting unit 310 is a modified transport protocol' as described above, and the method of selecting the modified transport protocol' may select a modified transport protocol' specialized for a corresponding characteristic by determining a characteristic of the network state using a predetermined criterion.

Further, when selecting a type of the modified transport protocol', it is possible to determine the modified transport protocol' by also considering a magnitude or a type of data to be transmitted between nodes, and the like.

The data transmitting/receiving unit 320 performs transmission of data between nodes using the transport protocol selected by the transport protocol selecting unit 310.

Meanwhile, even while transmission of data is being performed through selection of the modified transport protocol', the network state detecting unit 300 and the transport protocol selecting unit 310 perform detection of the network state and selection of the transport protocol at predetermined intervals, thereby enabling change of the modified transport protocol' and the like even during the transmission of data.

The transport protocol selecting apparatus may be installed in a form of a program in a data transmitting/receiving apparatus such as a server or a client, or may be connected to the data transmitting/receiving apparatus as a separate apparatus to thereby select the transport protocol.

When the transport protocol selecting apparatus is configured as the separate apparatus, the data transmitting/receiving unit of FIG. 3 may not be included in the transport protocol selecting apparatus.

As described above, although the present invention has been described with reference to the exemplary embodiments shown in the drawings, it is used to just describe the present invention and it will be able to be appreciated by those skilled in the art that various changes or equivalent exemplary embodiments can be made from Detailed Description of the invention. Accordingly, the scope of the present invention should be determined by the spirit of the appended claims.

The invention claimed is:

1. A method of selecting a modified transport protocol in a node constituting a public communication network, the method comprising:
   (a) detecting, using an agent program, a first network state with another node connected to the node based on round trip time (RTT) information, data transmission loss rate information of the communication network, line type information of the communication network, and user information of the communication network;
   (b) selecting a first modified transport protocol between the node and the another node using the first network state and information about a type and magnitude of data to be transmitted between the node and the another node, the first modified transport protocol is a modified transport protocol that can be used in the public communication network, and
- (c) at least one of transmitting data from the node to the another node using the first modified transport protocol or receiving data at the node from the another node using the first modified transport protocol while simultaneously detecting a second network state with the another node and selecting a second modified transport protocol between the node and the another node based on the second network state, the second transport protocol is a modified transport protocol that can be used in the public communication network;

wherein the first modified transport protocol and the second modified transport protocol are at least one of a transport protocol minimizing loss in transmitting data, a transport protocol minimizing latency in transmitting data, and a transport protocol minimizing a slow start of a transport control protocol (TCP).

2. The method of claim 1, wherein the first transport protocol and the second transport protocol are a same modified transport protocol.

3. The method of claim 1, wherein the first transport protocol is a different modified transport protocol from the second transport protocol.

4. An apparatus for selecting a modified transport protocol in a node constituting a public communication network, the apparatus comprising:
- a processor; and
- a non-transitory recording medium storing a program, the program when executed by the processor causes the processor to perform steps comprising:
- detecting, using a first network state with another node connected to the node based on round trip time (RTT) information, data transmission loss rate information of the communication network, line type information of the communication network, and user information of the communication network;
- selecting a first modified transport protocol between the node and the another node using the first network state and information about a type and magnitude of data to be transmitted between the node and the another node, the first modified transport protocol is a modified transport protocol that can be used in the public communication network, and
- at least one of transmitting data from the node to the another node using the first modified transport protocol or receiving data at the node from the another node using the first modified transport protocol while simultaneously detecting a second network state with the another node and selecting a second modified transport protocol between the node and the another node based on the second network state, the second modified transport protocol is a modified transport protocol that can be used in the public communication network;

wherein the first modified transport protocol and the second modified transport protocol are at least one of a transport protocol minimizing loss in transmitting data, a transport protocol minimizing latency in transmitting data, and a transport protocol minimizing a slow start of a transport control protocol (TCP).

5. A non-transitory recording medium storing a program to implement a method for selecting a modified transport protocol in a node constituting a public communication network, the method comprising:
- (a) detecting, using an agent program, a first network state with another node connected to the node based on round trip time (RTT) information, data transmission loss rate information of the communication network, line type information of the communication network, and user information of the communication network;
- (b) selecting a first modified transport protocol between the node and the another node using the first network state and information about a type and magnitude of data to be transmitted between the node and the another node, the first modified transport protocol is a modified transport protocol that can be used in the public communication network, and
- (c) at least one of transmitting data from the node to the another node using the first modified transport protocol or receiving data at the node from the another node using the first modified transport protocol while simultaneously detecting a second network state with the another node and selecting a second transport protocol between the node and the another node based on the second network state, the second transport protocol is a modified transport protocol that can be used in the public communication network;

wherein the first modified transport protocol and the second modified transport protocol are at least one of a transport protocol minimizing loss in transmitting data, a transport protocol minimizing latency in transmitting data, and a transport protocol minimizing a slow start of a transport control protocol (TCP).

* * * * *